July 7, 1970     H. H. MORRIS ET AL     3,519,453
CLAY PRODUCTS AND METHOD OF PRODUCING SAME
Filed April 10, 1967     13 Sheets-Sheet 1

INVENTORS
HORTON H. MORRIS
KENNETH L. TURNER

BY
ATTORNEYS

United States Patent Office 3,519,453
Patented July 7, 1970

3,519,453
CLAY PRODUCTS AND METHOD OF PRODUCING SAME
Horton H. Morris and Kenneth L. Turner, Gordon, Ga., assignors to Freeport Sulphur Company, New York, N.Y., a company of Delaware
Filed Apr. 10, 1967, Ser. No. 629,699
Int. Cl. C08h 17/06; C09c 1/42
U.S. Cl. 106—288                            8 Claims

ABSTRACT OF THE DISCLOSURE

New clay products having a novel and improved combination of properties including opacifying powers, particle size, surface area, oil absorption, G.E. brightness and color as well as low abrasion and comprising individual clay platelets adhered together providing increased void volume and high bulking properties that make them useful and uniquely desirable alone as paper fillers, prime or top coating pigments and particularly in combination with other well-known filler, prime or top coating pigments. The new clays also reduce pigment costs for obtaining high opaque papers and can be applied as top or prime coatings at low coat weights.

A method of producing the novel clay products, advantageously from coarse kaolin clay fractions which have been delaminated and which are substantially free of undelaminated aggregates and booklets, by heating the fractions in a specified manner until the combined properties, including opacity, particle size, surface area, oil absorption, G.E. brightness, color and abrasion are changed to form a unique and desirable structural product having clay particles adhered together, thereby providing a product having increased void volume within its structure. The method is also applicable to fine domestic kaolin clay fractions which have been delaminated.

BACKGROUND OF THE INVENTION

The art to which this invention pertains concerns clay pigments and method of producing same.

Attempts have previously been made to subject coarse as well as fine kaolin clay fractions to calcination for the purpose of producing paper fillers or paper coating pigments. Such clay products have been found unsatisfactory since desirable values for one or a combination of the above properties were not present—thus severely limiting their acceptance and use in the paper industry.

U.S. Pat. No. 3,171,718 discloses a method of first preparing a delaminated kaolin clay product and then subsequently subjecting the product to calcination. The term "calcination," as conventionally used, means the heating of clay to bring about the sharp exothermic reaction, as shown in conventional differential thermal analysis curves. The patentee found that by subjecting the delaminated clay to calcination, the calcined clay product possessed unusually high G.E. brightness and abrasion indices lower than undelaminated clay which is subsequently calcined in a similar manner.

SUMMARY OF THE INVENTION

The new clay products of this invention are comprised of a multiplicity of individual clay platelets substantially free of conventional stacks or booklets or undelaminated stacks or booklets in which the majority of the individual platelets are adhered together into numerous larger aggregates which can be likened to small popcorn balls. The individual platelets of more than two microns in diameter or size predominate on a weight basis and have a ratio of diameter to thickness, as determined by an electron microscope in excess of about six. The ratio of diameter to thickness increases as the diameter of the platelets increases. The adhered aggregates of individual platelets are retained and not destroyed when subjected to normal and conventional mixing and coating forces, resulting in a coated or filled paper having increased void volume or bulking characteristics, thus giving increased opacity while retaining all of the other advantageous properties of the new clay product, such as color, brightness, ink receptivity, and so forth.

The improved combinations of properties, particularly improved opacity, of the new clay of this invention can be achieved in various manners in the paper making and coating art. The new clay can be used as a paper filler pigment, as a prime paper coating pigment, as a top coating paper pigment, alone or in combination with other conventional paper filler or coating pigments.

The invention further includes paper and paper board having a prime coating adhered thereto containing the new clay product of this invention as the sole pigment or in combination with other conventional paper coating pigments.

The invention further includes paper and paper board having a top coating adhered thereto containing the new clay product of this invention as the sole pigment or particularly in combination with other conventional paper coating pigments with or without a prime coat containing the new clay product.

The invention further includes paper containing the new clay product as a filler pigment alone and particularly in combination with other conventional paper filler pigments and with or without prime coats and top coats containing the new clay product.

This invention further relates to a method of producing a domestic clay product having an improved combination of properties, as those above mentioned, by first preparing a delaminated domestic kaolin clay from coarse domestic clay fractions that is substantially free of undelaminated aggregates and booklets and is composed substantially of individual platelets, according to the process set forth in U.S. Pat. No. 3,171,718 to produce a clay product as therein defined. The delaminated clay thus formed is heated at least until an endothermic reaction begins but the heating is stopped prior to the initiation of an exothermic reaction to form the new clay product described above.

The new clay products of this invention are particularly advantageous when produced from coarse domestic kaolin clay fractions (having in the order of 60 percent of its aggregates below two microns in size), but very satisfactory results are also obtained when fine fractions (85 to 95 percent of its aggregates below two microns) are subjected to the novel method above indicated.

These improved combinations of properties are obtained even at low coat weights (three to five pounds per ream) on light weight paper such as a twenty-three pound (25" x 38"—500 count or 3300 ft.$^2$) catalog base stock, thus not only reducing the cost of a high opaque coated paper, but possibly even more important, significantly reducing the total weight.

DESCRIPTION OF THE PREFERRED EMBODIMENTS

It is well known that coating clays are produced in various grades and the particular grade is determined primarily by the percent of particles below two microns in size. A number one coating grade of clay will generally have 85–95 percent of its particles below two microns measured by the sedimentation process, a number two coating grade will have 80–85 percent of its particles below two microns, and a number three coating grade will contain perhaps 70 percent of its particles below two microns. A clay that contains 60 percent or less of its particles below two microns is generally sold as a filler clay, although there is some overlapping in these fields. In fact, the highest grade of coating clays may sometimes be used as fillers while a filler clay may sometimes be used as a coating pigment. The production of the finer particle size grades is expensive, since much (30–70 percent) of the starting clay is of coarser particle and, therefore, is either discarded or, more generally, is sold at a low price as filler clay.

Delaminated clay herein refers to clay fractions which have been subjected to the process described in U.S. Pat. No. 3,171,718 that converts the stacks or booklets of the clay fraction into platelets having a reduced thickness as described therein.

Coarse clay, as commonly used, is that clay which has about 60 percent of its particles below two microns in size.

Columbia coating clay is very fine clay and is designated as number two coating clay.

Particle size is measured by the sedimentation method as described in U.S. Pat. No. 3,171,718.

Figure 1:
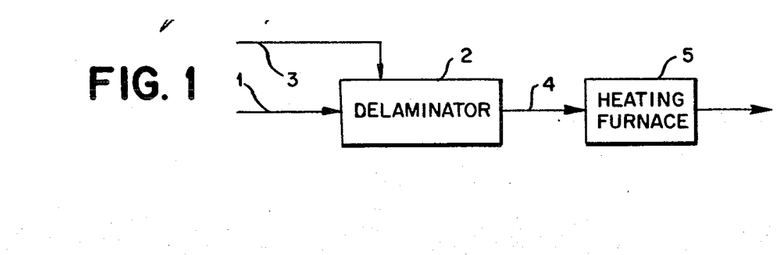
FIG. 1 is a schematic view of the method of this invention.

The invention may be described by first referring to FIG. 1 of the drawings. The delaminated feed material 1 is introduced into a clay delaminator 2 along with a clay suspension agent 3. The delaminated clay 4 is then removed from the delaminator 2 and introduced into a heating furnace 5 where it is subjected to modest thermal temperatures according to this invention.

The delaminator 2 may be of the type described in U.S. Pat. No. 3,171,718 which subjects the fractions to a fine milling mechanical action which may comprise the combination of (1) mild viscous shear milling due to agitation of the viscous mass composed of fine milling media, water and clay; (2) mild percussive milling due to the multiplicity of low inertia impacts offered by the collision of the fine milling media with itself and with clay; and (3) mild friction milling produced by the combination of rubbing action of the fine media to itself and of the fine media to the clay. This delaminated action can be effected by the use of a non-abrasive resilient plastic grinding media. Other processes can of course be used to produce the delaminated clay product as described therein.

The use of any non-abrasive resilient plastic grinding media is contemplated by this invention, such as beads or pellets of nylon, styrene-divinyl benzene copolymer, or other plastic materials. It is, however, advantageous that the specific gravity of the plastic material be less than that of the clay slurry when the agitation is stopped.

The suspension agent, which is preferred, is water, but it may comprise any of those well known in the art, as long as a clay slurry is thereby formed.

Figure 2:
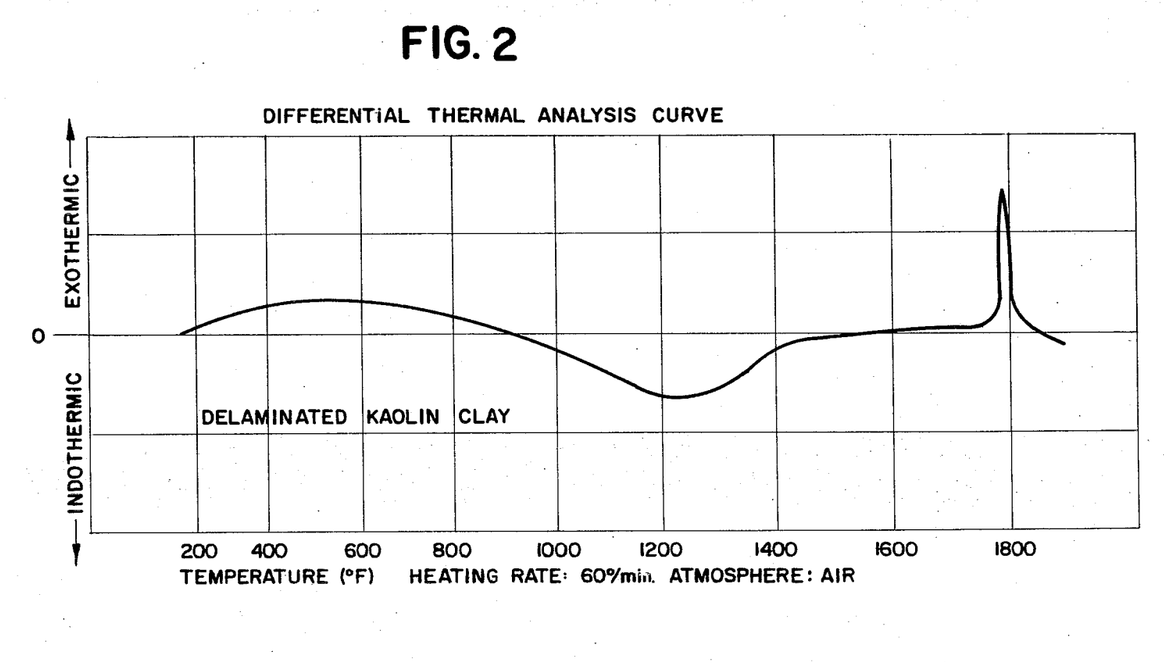
FIG. 2 is a differential thermal analysis curve of delaminated domestic kaolin clay.

Referring now to FIG. 2, it is observed that, as the delaminated clay is heated from approximately 200° F. to 600° F., an initial heat rise results, which thereafter gradually diminishes. This reaction is changed to an endothermic reaction when the temperatures between about 900° F. and 1500° F. are reached. The term "exothermic" reaction as used herein refers to the sharp exothermic reaction beginning above about 1600° F.

Figure 3:
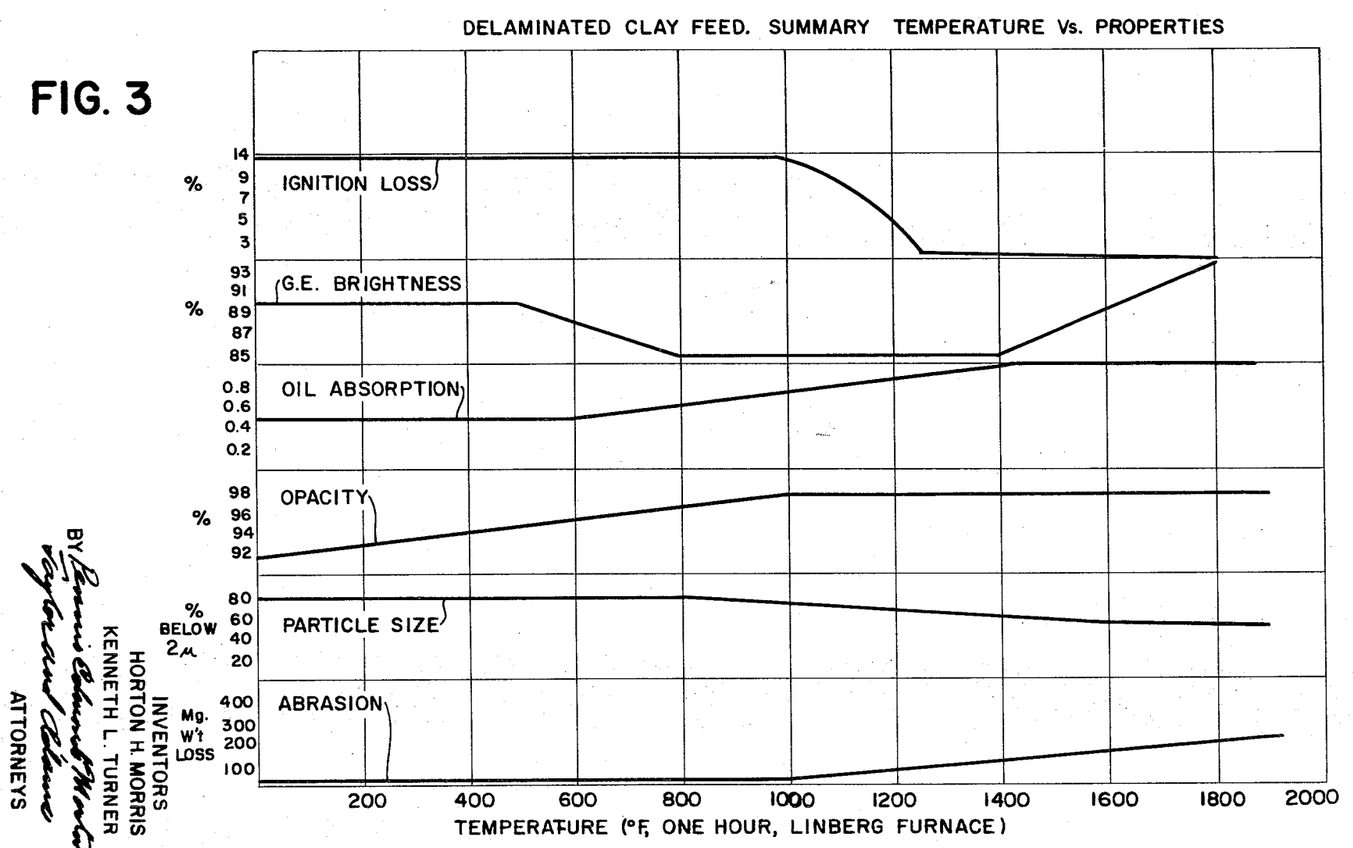
FIGS. 3 and 4 are a graphic illustration of various properties of heated and calcined delaminated kaolin clay.
Figure 4:
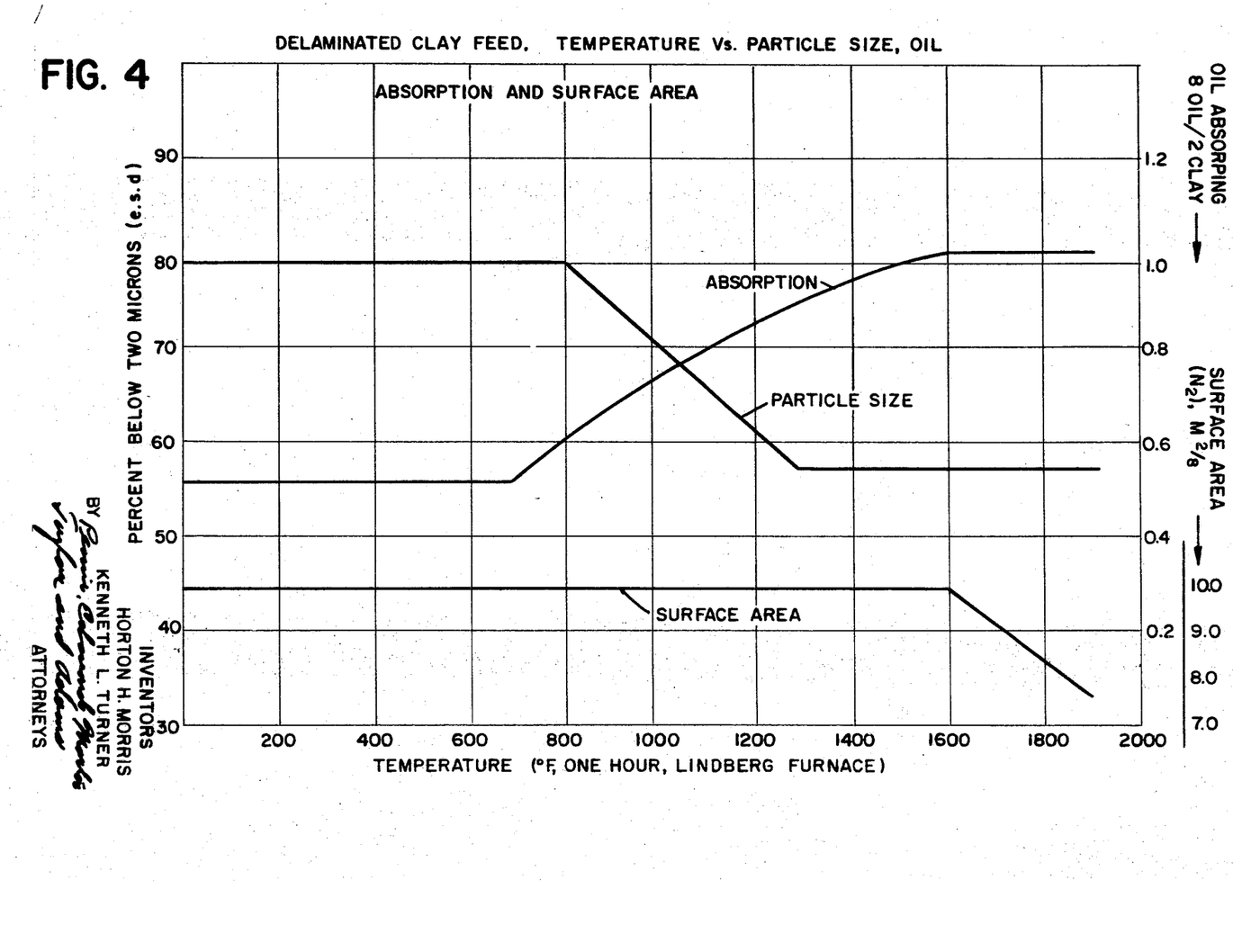

FIGS. 3 and 4 show the change in properties of delaminated clay (having 80 percent of its particles below two microns in size measured by the sedimentation process) as the temperature in a Lindberg heating furnace is increased for one hour.

The opacity of the delaminated clay is shown to increase in direct proportion to increasing temperatures until a maximum opacifying power is reached at about 1000° F. This maximum value is shown to remain substantially constant until the reaction reaches exothermic temperatures.

As the particle size coarsens at higher firing temperatures, it would be expected that the surface area would decrease; actually, no apparent change can be detected, at least in the range up to 1600° F. The oil absorption values, which can be considered to be a rough measure of surface area, show a very marked increase.

The changes in the properties can be resolved by the fact that during the endothermic reaction of the delaminated clay, a totally different structure is formed. This structure, as illustrated in the electron micrographs of FIGS. 5, 6 and 7, is shown to consist of expanded platelets of clay fractions being adhered together in a face-to-edge manner, to form a structure having an increased void volume.

Figure 5:
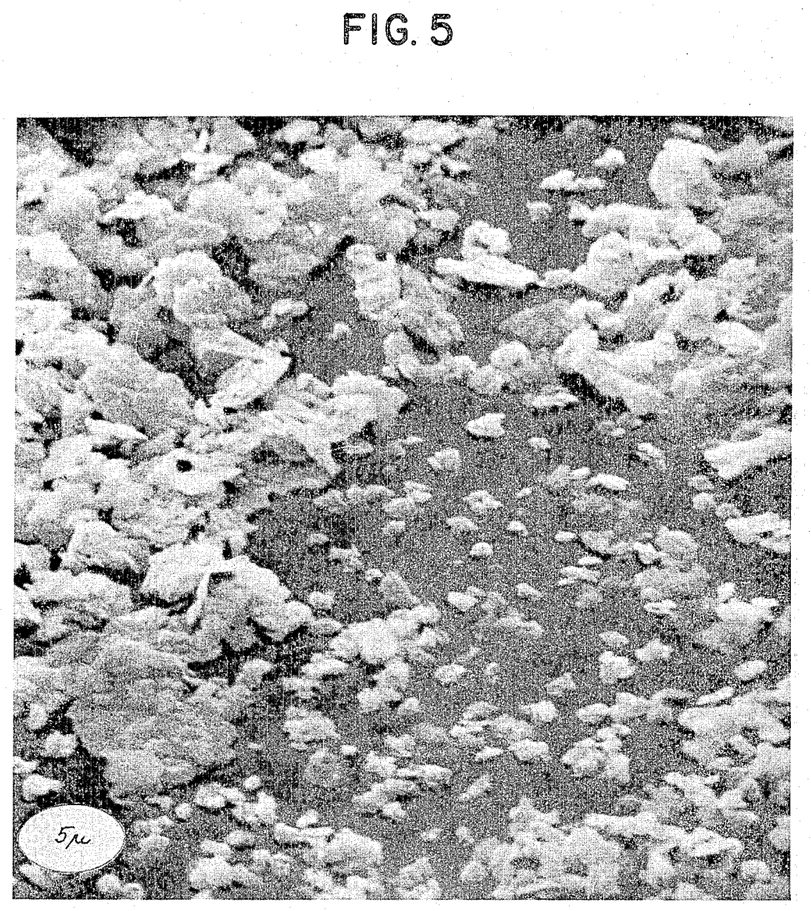
FIGS. 5, 6 and 7 are electron-micrographs of the product of this invention.
Figure 6:
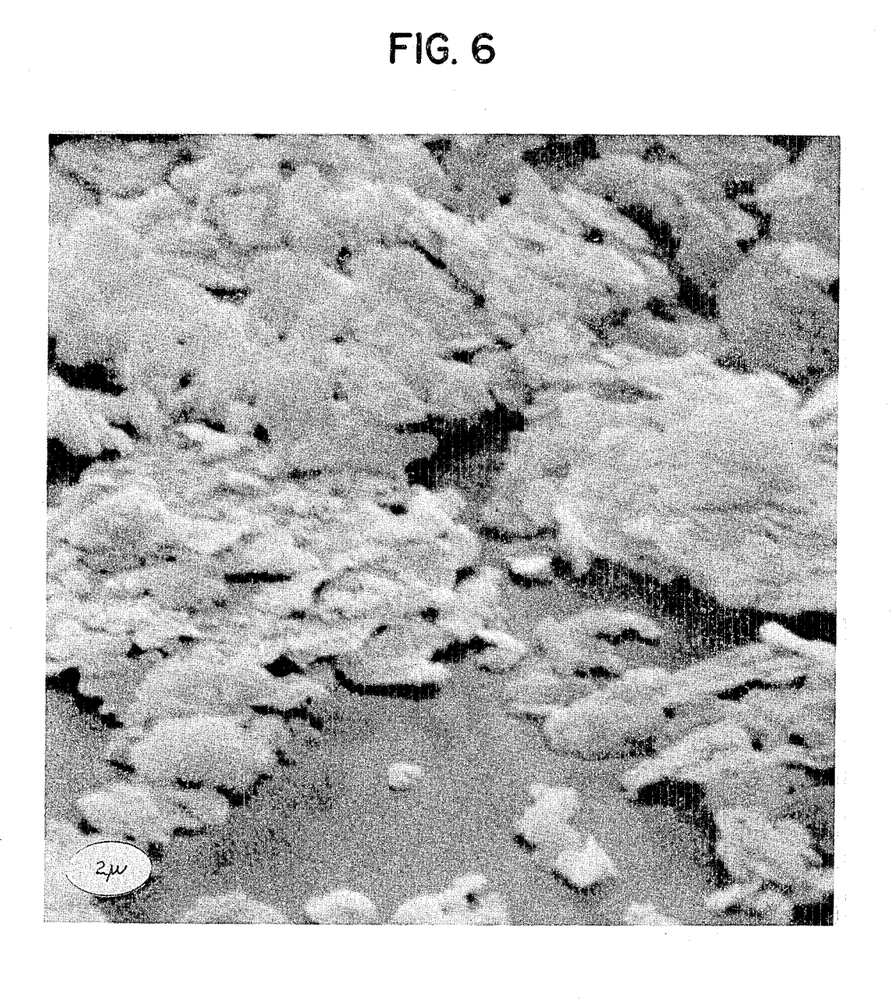
Figure 7:
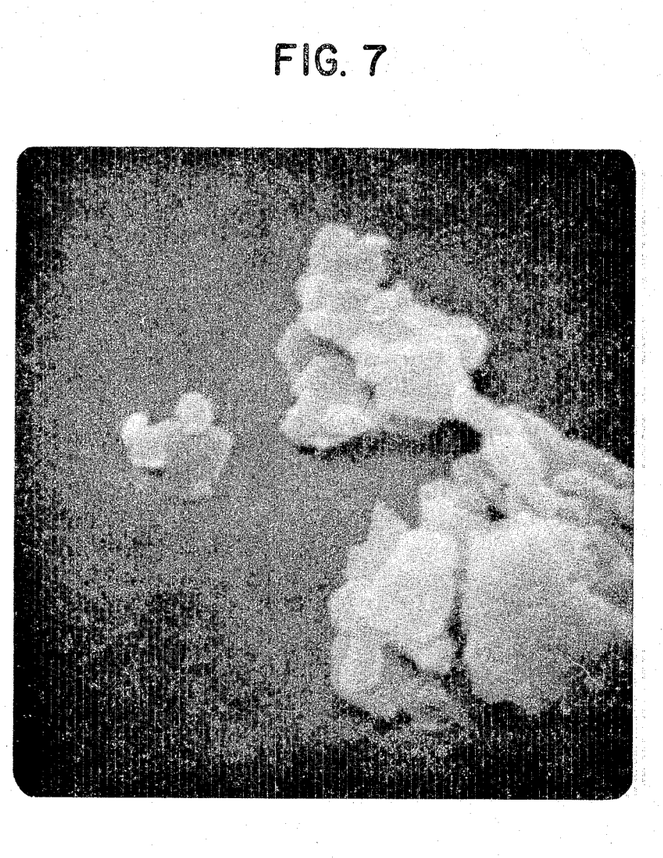

FIG. 5 was taken at a magnification of 32,000×, FIG. 6 at 10,500×, and FIG. 7, at 19,200×. In each of these micrographs the platelet structures are apparent, showing the adhered platelets forming aggregates or pop-corn ball-like structures. These structures are particularly apparent in FIG. 7. The striking differences can also be observed by comparison with the micrographs of conventional and delaminated clays in U.S. Pat. No. 3,171,718 to Gunn et al.

The production of such an open system accounts for little change in surface area while, at the same time, an increase in particle size and oil absorption of clay is observed.

Figure 8:
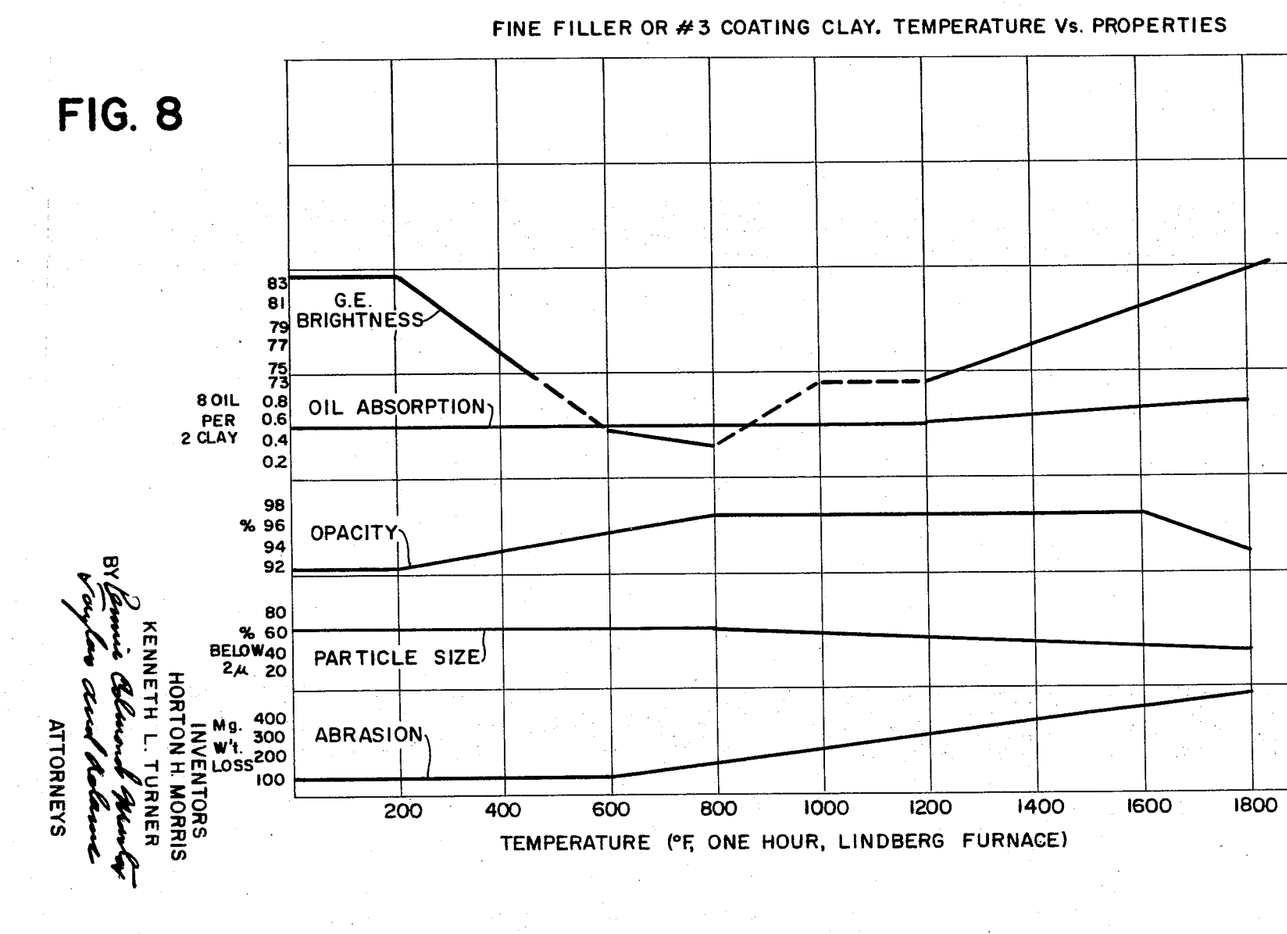
FIG. 8 is a graph of various properties of a heated and calcined fine filler or No. 3 coating clay.

FIG. 8 is inserted for the purposes of comparison. It shows the typical results obtained by heating an undelaminated filler or coarse coating clay over a range of temperatures. It will be noted that at approximately 800° F. the abrasion resistance has reached an unacceptable level and the G.E. brightness has dropped considerably. The oil absorption does not begin to increase until after 1200° F. and when the opacity has also reached a peak of 1200° F.

Figure 9:
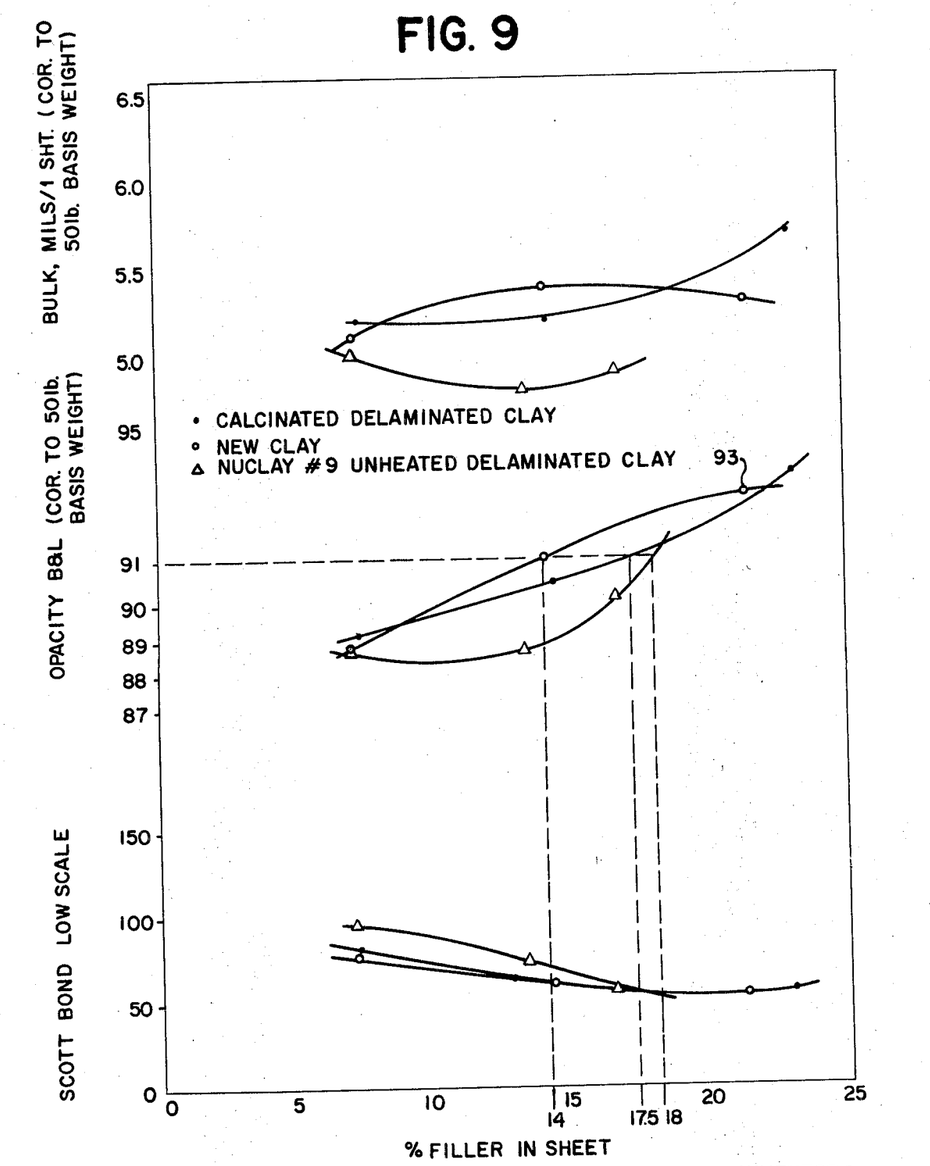
FIGS. 9, 10 and 11 are graphic views showing the properties of calcined delaminated domestic kaolin clay, the product of this invention, and unheated delaminated domestic kaolin clay.

FIG. 9 shows comparisons between a calcined delaminated clay heated for one hour at 1860° F., the new clay produced according to this invention, and an unheated delaminated clay. The results show the improved effects of the clay of this invention on uncalendered hand sheets.

It is to be noted that the bulk shows considerable improvement, particularly between about 9 to 18 percent filler, and that the opacity is also significantly improved, particularly between about 9 and 22 percent filler in the sheet. The bonding tests also show slightly lower values than the calcined delaminated clay and considerably lower than the unheated delaminated clay at lower filler levels.

Figure 10:
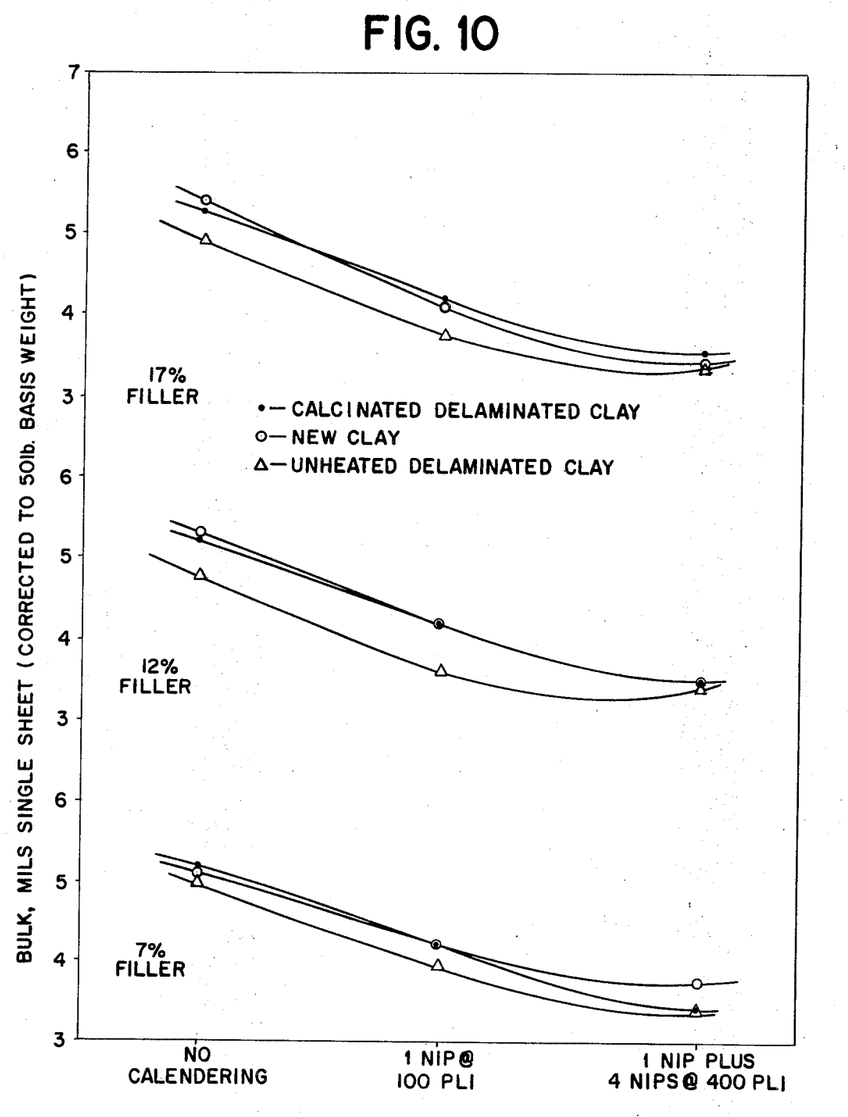

FIG. 10 shows the effect on the three types of clay referred to in FIG. 9 with various percent fillers in the sheet of calendering on the bulking characteristics of the clays. With 17 percent filler the new clay of this invention averages slightly lower in bulk than a calcined delaminated clay but above unheated delaminated clay. When the amount of filler is reduced to 12 percent, the bulking characteristics of the new clay are slightly higher than a calcined delaminated clay and considerably higher than the unheated delaminated clay. When the amount of filler is further reduced to 7 percent, the bulking characteristics average greater than that of either a calcined delaminated clay or an unheated delaminated clay, particularly at higher calendering pressures.

Figure 11:
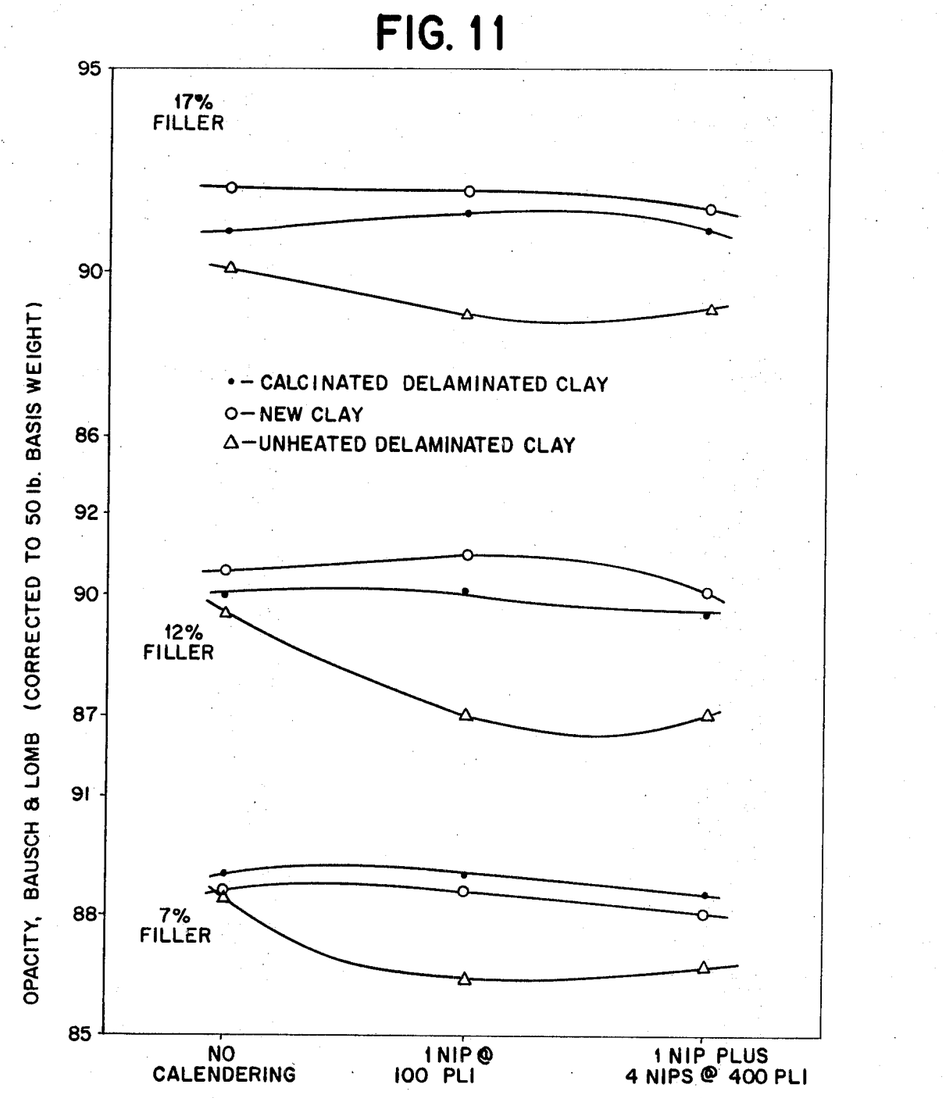

FIG. 11 compares the opacity of the same three clays at various filler levels and shows the variations in the opacity due to calendering. With both 17 percent and 12 percent filler in the paper, the new clay of this invention has considerably more opacity than either of the other two clays. When 7 percent filler is used in the sheets, the opacity of the new clay of this invention is slightly less than the calcined delaminated clay but significantly greater than the unheated delaminated clay.

Figure 12:
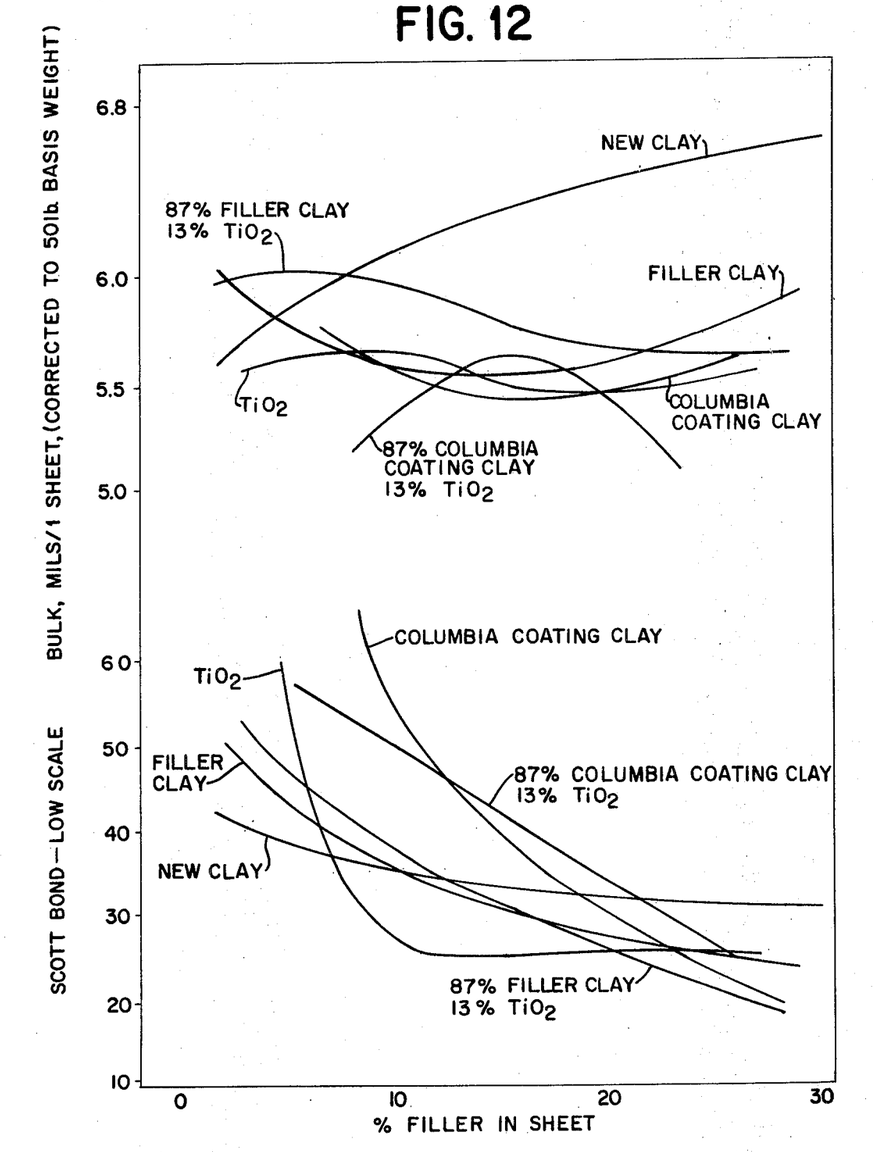
FIGS. 12, 13 and 14 are graphic illustrations comparing the product of this invention with other well-known paper fillers.
Figure 13:
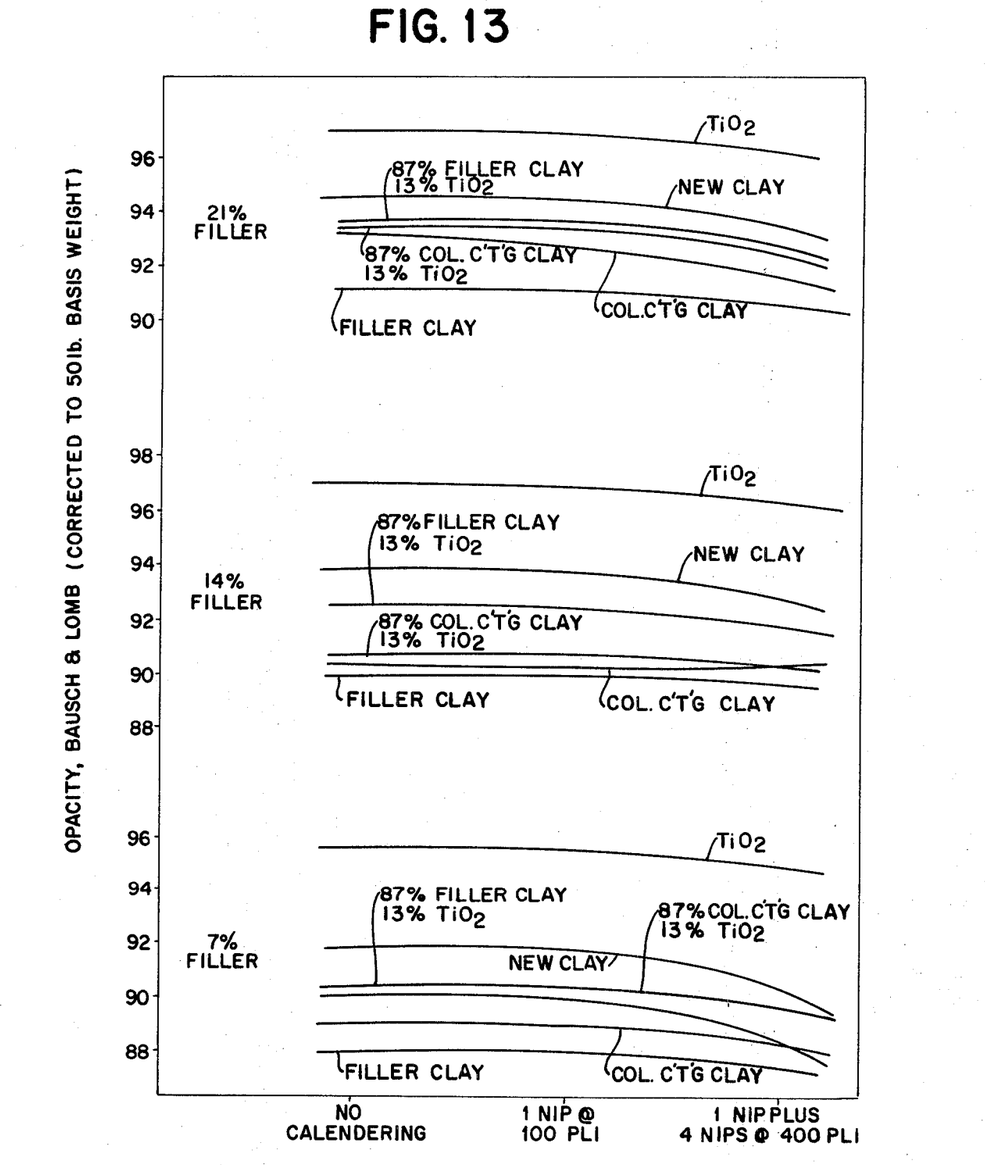
Figure 14:
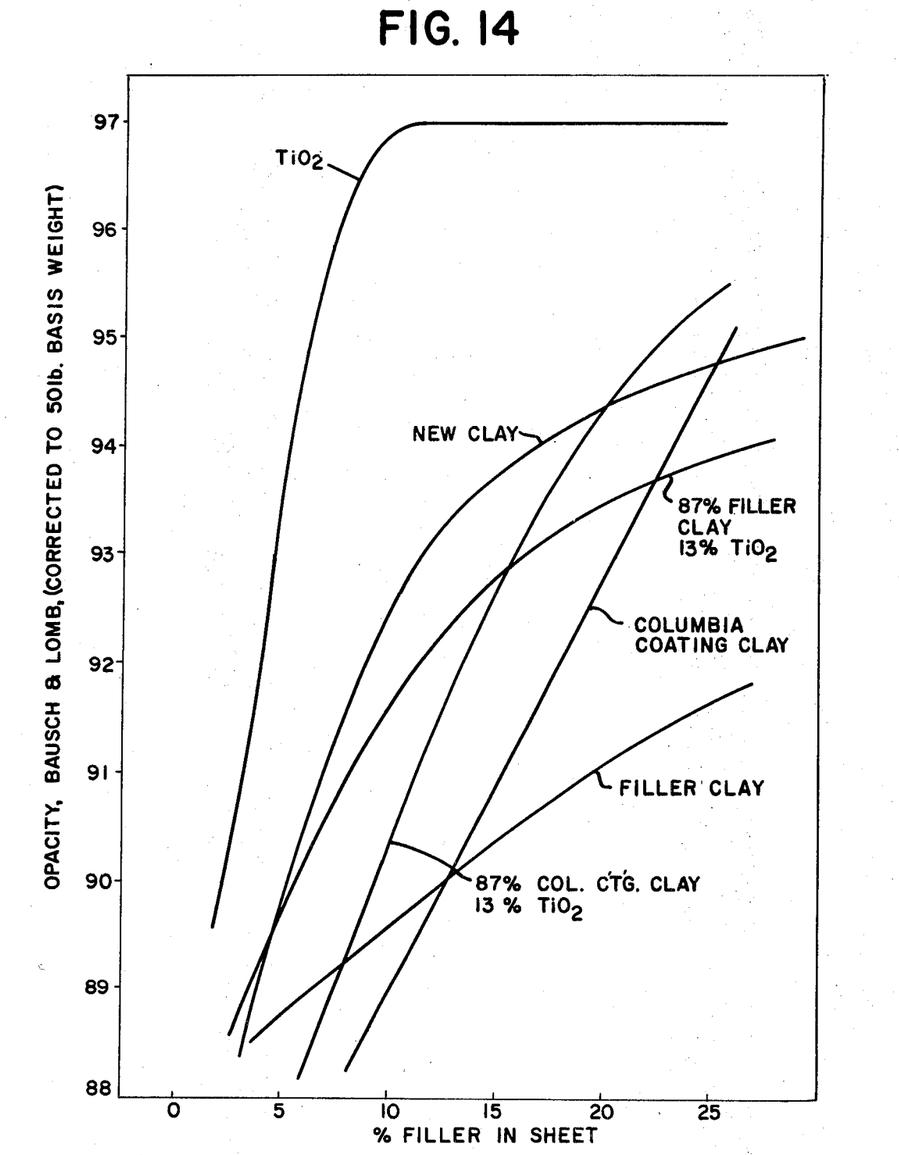

FIGS. 12, 13 and 14 compare the new clay of this invention with other coating and filler clays used alone and in combination. The bulking characteristics of the new clay, as can be seen in FIG. 12, are considerably greater beginning at approximately 9 percent filler content in the sheet than any of the other clays referred to therein, as well as titanium dioxide and a combination of the various clays with titanium dioxide. The Scott bond is lower than the other clays and combinations at the lower range of filler in the sheet and is intermediate with the other pigments through about 20 percent filler. It is to be noted that from a very low percent filler to a very high percent filler, the new clay does not vary nearly as much as the other clays and pigments but remains fairly constant.

FIG. 13 compares the opacity of the new clay with various percentage fillers in the sheets with the other clays and titanium dioxide. It should be noted that in each instance through the various filler ranges set forth in FIG. 13 that the new clay shows consistently and significantly higher opacity values than any of the other coating clays, filler clays or combinations with titanium dioxide. This includes those sheets which were not calendered, those calendered by one nip at 1000 p.l.i. and at one nip plus four nips at 400 p.l.i.

FIG. 14 compares the percent filler in the sheet with the opacity of the same fillers disclosed in FIGS. 12 and 13. The new clay of this invention shows considerably increased opacity over all of the other pigments and combinations of pigments, beginning at approximately 5 percent filler in the sheet to about 17 to 18 percent filler when it is surpassed by the combination of 87 percent coating clay and 13 percent titanium dioxide. The Columbia coating clay does not surpass the new clay of this invention until over 25 percent filler is present in the sheet.

The term "COL. C'T'G" clay in FIGS. 13 and 14 is Columbia coating clay.

All of the hand sheets upon which results were reported in FIGS. 9 through 14 with respect to use of the new clay of this invention as a paper filler were prepared by making up hand sheets in a conventional Noble and Wood sheet mold. In all instances, regardless of the type of filler used, the fiber furnish consisted of northern soft bleached kraft and 60 percent northern hardwood bleached kraft and cobeaten in a Valley laboratory beater to a Williams two gram slowness of 70 seconds. The hand sheets were otherwise processed in the conventional manner using about 2 percent rosin size and about 5 percent alum. The various percentages of fillers as reported in the graphs were then added to the prepared pulp together with 1 percent cationic starch, and the hand sheets were cast in the conventional manner. The new clay of this invention as pigment in the hand sheets was prepared in a manner identical or substantially identical to the example.

To further show the advantageous results of the new clay prepared according to this invention, undelaminated coarse clay having a particle size averaging 99 percent below 20 microns, 84 percent below 10 microns, 55 percent below 5 microns, 25 percent below 2 microns and 15 percent below 1 micron was tested, unheated, heated according to this invention at 1400° F. and calcined at 1850° F. The unheated sample had an oil absorption of 0.4 gms./gm. of clay, the sample heated to 1400° F., 0.54 gms./gm. of clay, and the calcined sample, 0.52. The contrast ratio or opacity for the unheated sample was 72.3, for the sample heated only to 1400° F., 84.2 and for the calcined sample, 80.8.

For the purpose of determining some of the advantages of using new clay in combination with other clays, as paper coating materials, the following mixtures, listed in Table II, were dispersed in water using a heavy duty Hamilton Beach mixer running at 10,000 r.p.m. for three to four minutes using 0.55 percent TSPP (a phosphate dispersing agent) based upon the dry weight of clay was added.

TABLE II

| Mixture: | Opacity |
|---|---|
| (1) 100% new clay | 88.5 |
| (2) 25% new clay, 75% Columbia coating clay | 86.3 |
| (3) 50% new clay, 50% Columbia coating clay | 86.3 |
| (4) 75% new clay, 25% Columbia coating clay | 87.4 |
| (5) 10% $TiO_2$, 90% Columbia coating clay | 86.7 |

A 30 percent Penford Gum 280 starch solution was prepared by cooking it for 30 minutes in a steam bath with constant agitation between 95° C. to 96° C. The solution was cooled to 35° C. and adjusted to 30 percent solids before the solution was added to the above clay water dispersions. The mixture of clay, water and starch was then diluted with water to adjust to 35 percent solids and mixed by a Lightning mixer.

Prime coatings were applied to 23 lb. (25" x 38"—500 count or 3300 ft.$^2$) catalog coating base stock sheets at four pounds per side by means of an adjustable laboratory trailing blade bench coater. The catalog base stock sheets were first coated on the wire side, dried with air at 350° F. and then coated on the felt side.

The coated base stock sheets were conditioned in a constant temperature and humidity room for 12 hours prior to calendering and testing. The paper sheets were calendered on a three-roll super calender (steel-cotton-steel) for a total of four nips (two nips against steel and two nips against cotton alternately) at about 1000 pounds per lineal inch. The calenders were preheated to 130° F. before calendering was started.

Basing the measurements upon obtaining the same or substantially similar values of opacity as measured by the standard TAPPI procedure, it was determined that, for a given weight of pigment, new clay was a more advantageous and economical opacifying agent as compared to $TiO_2$ when each was used in combination with a third type of paper coating pigment.

While the new clay was only utilized in combination with Columbia coating clay in the above tests, this invention contemplates the economical advantage that is possible to be obtained when new clay is used in combination with one or more well-known paper fillers or pigments for top or prime coating pigments for paper.

To further illustrate the advantages of the use of the new clay of this invention as prime and top coatings, the light weight body stock was prime coated as described above, using the same percentage of total filler with a Columbia coating clay, a delaminated clay, and a mixture of 90 percent delaminated clay with 10 percent of the new clay. The coating clay sample had an opacity of 85.8; the delaminated clay sample, 87.2; and the mixture of 90 percent delaminated clay with 10 percent new clay, 89.8. The above results again illustrate the increased opacity obtained by using the new clay of this invention.

A series of sheets were also prepared and calendered to a 40–45 gloss level by varying the calendar stack pressure as required. The sheets were prepared in the same manner as described above. A sheet containing only a No. 2 coating clay as the pigment had an opacity of 85.8. A sample sheet containing 90 percent No. 2 coating clay and 10 percent titanium dioxide had an opacity of 88.1. A sheet containing only delaminated clay had an opacity of 88.3. A sheet containing 90 percent delaminated clay and 10 percent titanium dioxide had an opacity of 90.3.

A sheet containing 90 percent delaminated clay and 10 percent of the new clay of this invention had an opacity clay and 20 percent of the new clay had an opacity of 89.5.

It can readily be seen from these results that an opacity substantially approaching that obtained by using titanium of 89.1, and a sheet containing 80 percent delaminated dioxide can be obtained by using the new clay of this invention. Based on current prices today, it is quite apparent that the cost of obtaining a high opacity of 89.1 using the new clay of this invention is less than one-half of the cost of obtaining the slightly higher opacity of 90.3 by the addition of titanium dioxide.

Further samples were made using the new clay of this invention in double coatings using a prime and top coating. The light weight base stock as described above was primed at two pounds per ream per side in the same manner described above, using the new clay produced according to this invention and the same adhesive mixture as described above. A top coat was then applied thereover at two pounds per ream per side. The top coating was the same as the prime coat except that it contained only delaminated clay as the pigment. The resulting double coating had an opacity of 89.3. Further samples were produced in the identical manner using only delaminated clay as the prime coating pigment and only a No. 2 Columbia coating clay as the prime coating pigment and placing on top of each of these prime coats the same top coat, using delaminated clay as was coated on the prime coating containing the new clay. When the delaminated clay was used in the prime coating, the sample had an opacity of 87.0, and when the No. 2 coating clay was used as the pigment in the prime coating, the sample had an opacity of 86.0. In each instance the adhesive level per 100 parts of pigment in the prime coat was 15 parts and in the top coat, 11 parts. Also in each instance the samples were calendered at 1000 p.l.i. at 130° F.

The following illustrates one example of how the new clay of this invention can be produced and represents as well the best mode.

A coarse clay which had been conventionally degritted as well as having some of the fines removed therefrom and having a particle size of between 27–30 percent clay particles below two microns was dispersed in water to give a suspension containing approximately 45 percent solids. A small amount of tetrasodium pyrophosphate was used as a dispersing agent. This dispersion was fed continuously to a delaminator such as that disclosed in FIG. 1 of U.S. Pat. No. 3,171,718 with styrene divinylbenzene pellets (approximately one-tenth-inch in length) so that a ratio of dry clay to the pellets was about 5:3. The apparatus permitted the removal of fines at the rate desired and allowed a selection of the particular grade product desired, graded on a particle size distribution. The delamination was carried out in a similar manner as described in Example 9 of U.S. Pat. No. 3,171,718, in which the clay had a total residence time of about 35 minutes in the delaminator. After the delamination was completed, the resulting clay had a particle size of about 60–62 percent below two microns, as measured by the sedimentation process. The delaminated clay was then centrifuged to remove some of the discolored matter and to reduce the particle size of the invention to approximately 78 percent below two microns. This delaminated product was then bleached to a G.E. brightness of 90 and filtered and dried to between 1 to 2 percent moisture.

The resulting delaminated product was then heated in an apparatus conventionally used for calcining clay to a temperature of 1200° F., such as a Lindberg furnace. The temperature of the clay rose to 1200° F. within approximately one hour, whereupon the heating was discontinued and the new clay product removed from the furnace and cooled.

All of the results and tests (both filler and coating) reported for the new clay of this invention were made with a new clay produced according to this example or one very similar to it. The particle size of the initial feed to the delaminator as well as the particle size of the delaminated clay would of course vary somewhat from batch to batch, and the particle size of the initial feed to the delaminator may have varied between about 25 to 40 percent below two microns.

In Pat. No. 3,171,718 fairly low abrasion resistance index values were reported in some instances. Particular attention is called to Example 2, where a fairly coarse starting clay was delaminated by using an oscillating "Red Devil" paint container and shaken for a period of five hours. Since it is not practical from a commercial standpoint to delaminate clays for such long periods of time, an attempt was made to produce a commercially acceptable clay by limiting the residence time of clay in the delaminator (about 30 minutes to an hour and a half); and it was found that the abrasion indices of the resultant products went considerably beyond the acceptable standards upon calcination as defined herein.

FIG. 3 shows the increase in abrasion when a commercially delaminated product was used having a residence time of approximately 35 minutes in the delaminator. It is noted that the abrasion went up to or above 200 at calcination temperatures.

Thus this invention further includes the discovery that novel clays can be produced having the improved combination of properties by limiting the heating of these commercially produced delaminated clays (low residence time in the delaminator) to the ranges specified herein, namely, at least until the endothermic reaction begins and stopping the heating prior to initiation of the exothermic reaction.

A further discovery was made that regardless of the type of feed involved, the laboratory results as reported in Pat. No. 3,171,718 did not hold true when the delaminated clays were calcined on a continuous basis on commercial equipment. Even though acceptable abrasion indices could be obtained with laboratory equipment, such as a Lindberg electric furnace, where there was no continuous movement of the clays being calcined, the abrasion resistance went considerably above acceptable levels when an attempt was made to calcine these materials in a commercial type heater, such as direct flame impingement. An example of commercial heating equipment of this type is the Herschoff furnace.

Thus the invention further includes the discovery that the abrasion resistance of the products can be retained at an acceptably low figure while still maintaining all of the other advantageous properties of the new clays of this invention by utilizing commercial heating equipment, normally used for calcining clays, by heating the clays at least until an endothermic reaction begins but stopping the heating prior to the initiation of the typical exothermic reaction involving in conventional calcining.

The term "new clay" as used herein means the new clay produced according to this invention by heating the delaminated clay at least until an endothermic reaction begins and stopping the heating prior to the initation of the exothermic reaction.

The various values reported in this specification were determined as follows.

The abrasion values were determined by the "modified" method described in U.S. Pat. No. 3,171,718, using the Valley abrasion tester. The values are approximately twice the value as would be found by using the approved method of the Institute of Paper Chemistry.

Pigment brightness, or G.E. brightness, represents an average of three determinations made using the conventional G.E. reflectance meter.

The ignition loss figures were obtained by heating samples at 1860° F. for a one-hour period and the weight loss reported as ignition loss by dividing the weight loss by the weight of the original sample times 100.

The particle size was determined by the standard TAPPI sedimentation procedure (T-649-sm-54).

The oil absorption values were obtained by a method similar to the ASTM D-281-31 and represent the number of grams of linseed oil per gram of clay that are required to just fill all the voids in the mix. The sample appearance changes from a dry to a "slick" texture.

The opacity or contrast ratio was determined by the TAPPI method by preparing a 100 percent clay-loaded polyvinyl acetate latex at 65 percent solids using 4.22 pound per gallon of clay. This is considered equivalent to a paper board coating of 100 parts clay and 22 parts latex (solids) at 46 percent solids. A 0.003 wet film is cast on Morest panels having black 5 percent reflectance and white 80 percent reflectance, and the film is allowed to dry for twenty-four hours. Film reflectance values are then determined over the white and black using a conventional Photovolt Reflectometer using Search Unit 610Y (blue filter). The contrast ratio is then determined by dividing the film reflectance over black by the film reflectance over white, times 100.

The bulking values were determined by direct measurement of the sheets.

The sedimentation or sediment volume of various clays was also compared with the new clay produced according to this invention. To determine the sediment volume, 250 grams of each dry clay was plunged in 583 grams of tap water and sufficient tetrasodium pyrophosphate added to give the slip a pH of approximately 7.5. Granduated mixing cylinders were then filled with 250 cc. of the prepared slip and the samples allowed to settle. The sediment volume of each sample was determined periodically. The results showed that the new clay produced according to this invention had a maximum sediment volume of 104 cc. which was reached in 250 hours. An unheated delaminated clay which was the feed used to produce the new clay tested would not reach a maximum sediment volume. However, the rate of sedimentation began slowing considerably at about 125 hours, and at 250 hours the sediment volume was 70. A calcined No. 2 coating clay had a maximum sedimentation volume of 85 cc., which was obtained in about 250 hours.

It should be understood that the particle sizes referred to herein are measured by the TAPPI sedimentation process which does not represent actual or true particle size as determined by the electron micrograph. Although the TAPPI method represents a fairly accurate particle size with conventional clays containing stacks or booklets, it does not do so with delaminated clays.

The new clay products of this invention can be used as pigments in the same manner as conventional pigments. When used in prime or top coating pigments, conventional adhesives such as starch, casein or various latices such as styrene-butadiene copolymers can be employed as binders and coated on paper by conventional coating processes.

We claim:

1. A clay product produced from domestic clay fractions, said clay product having an improved combination of properties including good opacifying power, particle size, surface area, oil absorption, G.E. brightness and color, as well as low abrasion, said clay product being substantially free of undelaminated aggregates and booklets and composed substantially of individual platelets and containing a sufficient amount of platelets of more than two microns in size so as to predominate on a weight basis, the platelets in excess of two microns in size of said product having a ratio of diameter to thickness as determined by the electron microscope which is in excess of about six and in which the ratio of diameter to thickness increases as the diameter of platelets increases, and having the platelets adhered together to form an aggregate structure having an increased void volume and high bulking characteristics, the adherence between the platelets being sufficiently strong to prevent destruction of the structure when the product is used as a paper coating or filler.

2. A paper coating composition containing a clay product produced from domestic clay fractions, said clay product having an improved combination of properties including good opacifying power, particle size, surface area, oil absorption, G.E. brightness and color, as well as low abrasion, said clay product being substantially free of undelaminated aggregates and booklets and composed substantially of individual platelets and containing a sufficient amount of platelets of more than two microns in size so as to predominate on a weight basis, the platelets in excess of two microns in size of said product having a ratio of diameter to thickness as determined by the electron microscope which is in excess of about six and in which the ratio of diameter to thickness increases as the diameter of platelets increases, and having the platelets adhered together to form an aggregate structure having an increased void volume and high bulking characteristics, the adherence between the platelets being sufficiently strong to prevent destruction of the structure and a paper coating pigment, said paper coating containing at least 10% of said clay product based on the total amount of pigment and clay product.

3. The composition of claim 2 wherein the paper coating pigments are selected from the group consisting of number one, number two and number three coating clays, filler clay and $TiO_2$, said number one coating clay being a clay containing 85–95 percent of its particles below two microns, said number two coating clay being a clay having 80–85 percent of its particles below two microns and said number three coating clay being a clay having about 70 percent of its particles below two microns.

4. Paper having top coating thereon containing a pigment produced from domestic clay fractions, said clay product having an improved combination of properties including good opacifying power, particle size, surface area, oil absorption, G.E. brightness and color, as well as low abrasion, said clay product being substantially free of undelaminated aggregates and booklets, and composed substantially of individual platelets and containing a sufficient amount of platelets of more than two microns in size so as to predominate on a weight basis, the platelets in excess of two microns in size of said product having a ratio of diameter to thickness as determined by the electron microscope which is in excess of about six and in which the ratio of diameter to thickness increases as the diameter of platelets increases, and having the platelets adhered together to form an aggregate structure having an increased void volume and high bulking characteristics, the adherence being sufficiently strong to prevent destruction of the structure when the product is used as a paper coating.

5. Paper containing a filler pigment product produced from domestic clay fractions, said clay product having an improved combination of properties including good opacifying power, particle size, surface area, oil absorption, G.E. brightness and color, as well as low abrasion, said clay product being substantially free of undelaminated aggregates and booklets and composed substantially of individual platelets and containing a sufficient amount of platelets of more than two microns in size so as to predominate on a weight basis, the platelets in excess of two microns in size of said product having a ratio of diameter to thickness as determined by the electron microscope which is in excess of about six and in which the ratio of diameter to thickness increases as the diameter of platelets increases, and having the platelets adhered together to form an aggregate structure having an increased void volume and high bulking characteristics, the fusion being sufficiently strong to prevent destruction of the structure when the product is used as a paper filler.

6. The method of producing a domestic clay product having an improved combination of properties including good opacifying power, particle size, surface area, oil absorption, G.E. brightness and color, as well as low abrasion, consisting essentially of preparing a delaminated domestic kaolin clay from domestic clay fractions, said delaminated clay being substantially free of undelaminated aggregates and booklets, being composed substantially of individual platelets and containing a sufficient amount of platelets of more than two microns in size so as to predominate on a weight basis, the platelets in excess of two microns in size of said product having a ratio of diameter to thickness as determined by the electron microscope, which is in excess of about six and in which the ratio of diameter to thickness increases as the diameter of platelets increases, heating the delaminated clay at least until an endothermic reaction begins and stopping the heating prior to initiation of the exothermic reaction, thereby forming a structure having the platelets adhered together to form aggregate structures of the individual platelets having increased void volume and high bulking characteristics, the adherence being sufficiently strong to prevent destruction of the structure when the product is used as a paper coating or filler.

7. The method of claim 6 including intermixing said aggregate structured product with paper coating pigments, in an amount corresponding to at least 10% of said clay product based on the total amount of paper coating pigment and clay product.

8. The method of claim 7 wherein said pigments are selected from the group consisting of number one, number two and number three coating clays, filler clay and $TiO_2$, said number one coating clay being a clay containing 85–95 percent of its particles below two microns, said number two coating clay being a clay having 80–85 percent of its particles below two microns and said number three coating clay being a clay having about 70 percent of its particles below two microns.

References Cited
UNITED STATES PATENTS

| | | | |
|---|---|---|---|
| 3,171,718 | 3/1965 | Gunn et al. | 106—72 |
| 3,224,892 | 12/1965 | Hemstock | 106—72 |
| 3,236,606 | 2/1966 | Moore et al. | 106—72 |

JAMES F. POER, Primary Examiner

U.S. Cl. X.R.

23—110; 106—72

UNITED STATES PATENT OFFICE
CERTIFICATE OF CORRECTION

Patent No. 3,519,453                      Dated July 7, 1970

Inventor(s) Horton H. Morris et al.

It is certified that error appears in the above-identified patent and that said Letters Patent are hereby corrected as shown below:

In the drawings, Figure 2, "indothermic" on graph should read -- endothermic --; Figure 4, second line of graph, cancel "AND SURFACE AREA"; label at right of graph, "OIL ABSORPING 8 OIL/2 CLAY" should read -- OIL ABSORPTION g. OIL/g. CLAY --; and "M 2/8" should read -- $M^2/g$. --; Figure 8, label at left "8 OIL PER 2 CLAY" should read -- g. OIL PER g. CLAY --: Figure 9, top graph, "calcinated" should read -- calcined --; Figure 10, "calcinated" should read -- calcined --; Figure 11, "calcinated" should read -- calcined --. Column 4, line 6, "change" should read -- changes --; line 31, "32,000 X" should read -- 3,200X --; line 59, "to" should read -- and --. Column 5, line 35, "1000" should read -- 100 --. Column 7, line 2, after "opacity" insert -- of 89.1 and a sheet containing 80 percent delaminated --; line 7, cancel "of 89.1, and a sheet containing 80 percent delaminated --. Column 8, line 59, "initation" should read -- initiation --. Column 9, line 11, "pound" should read -- pounds --; line 29, "Granduated" should read -- Graduated --.

Signed and sealed this 6th day of April 1971.

(SEAL)
Attest:

EDWARD M. FLETCHER, JR.
Attesting Officer

WILLIAM E. SCHUYLER, JR.
Commissioner of Patents